(12) United States Patent
Carmichael

(10) Patent No.: US 9,986,390 B2
(45) Date of Patent: May 29, 2018

(54) VIDEO CELL PHONE MESSENGER

(76) Inventor: Christopher Carmichael, Irvine, CA (US)

( * ) Notice: Subject to any disclaimer, the term of this patent is extended or adjusted under 35 U.S.C. 154(b) by 0 days. days.

(21) Appl. No.: 13/529,735

(22) Filed: Jun. 21, 2012

(65) Prior Publication Data

US 2013/0023245 A1 Jan. 24, 2013

Related U.S. Application Data

(60) Provisional application No. 61/499,474, filed on Jun. 21, 2011.

(51) Int. Cl.
| | | |
|---|---|---|
| *H04W 74/00* | (2009.01) | |
| *H04W 4/12* | (2009.01) | |
| *H04W 4/16* | (2009.01) | |
| *H04M 1/57* | (2006.01) | |

(52) U.S. Cl.
CPC .............. *H04W 4/12* (2013.01); *H04M 1/576* (2013.01); *H04W 4/16* (2013.01); *H04M 1/578* (2013.01)

(58) Field of Classification Search
CPC .. H04M 1/6505; H04M 3/493; H04M 1/2478; H04M 3/4228; H04M 1/247; H04M 3/487; H04M 7/006
USPC ... 455/569.2, 575.9, 344, 435.1, 345, 414.1, 455/466; 379/29.01
See application file for complete search history.

(56) References Cited

U.S. PATENT DOCUMENTS

| | | | | |
|---|---|---|---|---|
| 5,727,156 A | * | 3/1998 | Herr-Hoyman | G06Q 10/10 705/26.8 |
| 5,790,173 A | * | 8/1998 | Strauss | H04L 29/06 348/E7.07 |
| 6,459,776 B1 | * | 10/2002 | Aktas | H04M 3/5307 379/88.13 |
| 8,270,933 B2 | * | 9/2012 | Riemer et al. | 455/345 |
| 2001/0050977 A1 | * | 12/2001 | Gerszber | H04M 1/253 379/88.13 |
| 2002/0120690 A1 | * | 8/2002 | Block | 709/206 |
| 2004/0203776 A1 | * | 10/2004 | Jun | 455/435.1 |
| 2008/0165937 A1 | * | 7/2008 | Moore | G10L 17/22 379/88.04 |
| 2009/0070213 A1 | * | 3/2009 | Miller | G06Q 30/02 705/14.17 |
| 2009/0156180 A1 | * | 6/2009 | Slavin | G06Q 20/3274 455/414.1 |
| 2009/0185665 A1 | * | 7/2009 | Chen | 379/29.01 |
| 2009/0264112 A1 | * | 10/2009 | De Zen | H04M 3/42042 455/415 |
| 2011/0029616 A1 | * | 2/2011 | Wang et al. | 709/206 |
| 2012/0011450 A1 | * | 1/2012 | To | 715/752 |

* cited by examiner

*Primary Examiner* — Joseph Arevalo
(74) *Attorney, Agent, or Firm* — Law Office of Scott C Harris, Inc

(57) ABSTRACT

A video cell phone messenger that provides caller ID streaming with sound and/or video, and provides a virtual greeting that users get when a call or text. A customized message is sent as part of an outgoing communication to another user who is being contacted by the user, in place of a numerical caller ID. The phone also sends text messages, and a second picture and sound forms a second customized message for texts.

13 Claims, 1 Drawing Sheet

VIDEO CELL PHONE MESSENGER

This application claims priority from 61/499,474, filed Jun. 21, 2011, the entire contents of which are herewith incorporated by reference.

BACKGROUND

Cellular phones have conventionally indicated to the user that they have received a message, byways other than the conventional cell phone call. For example, cell phones can receive a voicemail. If the user is not available, the system conventionally plays a premade voicemail greeting to the calling person. Subsequently, that calling person can record a message which can be provided to the user to indicate that the user that they have missed a call. Other forms of messages include SMS messages (text messages) and others.

Cell phones also provide caller ID, in which the calling person can receive information indicative of who specifically has called.

SUMMARY

The present application describes a form of notification to a user that is multimedia in nature, that is it provides multiple different kinds of media indicative of the specific information.

According to a specific embodiment, notifications are provided that include both video and pictures along with those notifications.

DETAILED DESCRIPTION

The present application describes a new way of providing notification to a user who is using a cell phone, PDA, smart phone, tablet, or any other kind of communicator.

Figure 1:
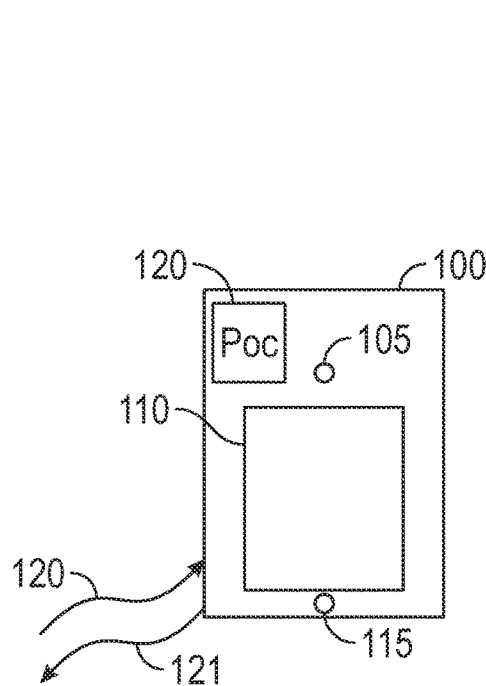
FIG. 1 shows a cell phone sending and receiving messages.

FIG. 1 illustrates a first an initial environment in which a user records and/or forms information which will be provided to calling users. The smart phone 110 may be a tablet or the like, and may have a camera 105 as shown, and a display screen 110. A microphone 115 picks up the sound. The smart phone 110 includes a processor 120 that runs a routine that includes the steps described herein.

At 200, the user makes a greeting, which may be done using the camera 105 to take a picture of the user saying something, such as "hi it's Chris, leave me a message". At 210, the user can customize the screen, using any of the applications that can run on the smart phone, to create a color scheme, or otherwise customize the greeting to include music or the like. This message may be provided to any caller.

300 represents another user making a call, which can be an incoming call as shown at 120. If the user owning the phone 110 is unavailable, then the user who made the call at 120 receives the customized greetings sent as 121 at 310. That is, instead of the caller receiving the system generated greeting, the caller receives the specific virtual greeting which was made by the user. That greeting may include the user's likeness taken from the camera along with the user's own voice.

In one embodiment, this may be received when the user makes a phone call. In another embodiment, any time any caller calls the user owning the phone 100 or communicates to the user in any way, they receive the greeting. The user may record a second greeting for texts are which may be a multimedia greeting that may include the user's picture along with the special text message such as thanks for texting me. The user may receive the video/audio greeting when they make a call.

According to another embodiment, outgoing calls are modified to include customized multimedia from the caller. When the owner of the phone 100 makes an outgoing call, instead of playing caller ID, a multimedia form of caller ID is provided at 121. That multimedia caller ID may include any of the customized greetings from 210. Instead of a receiver only receiving a telephone number, that receiver can receive any of the customized greetings.

Figure 2:
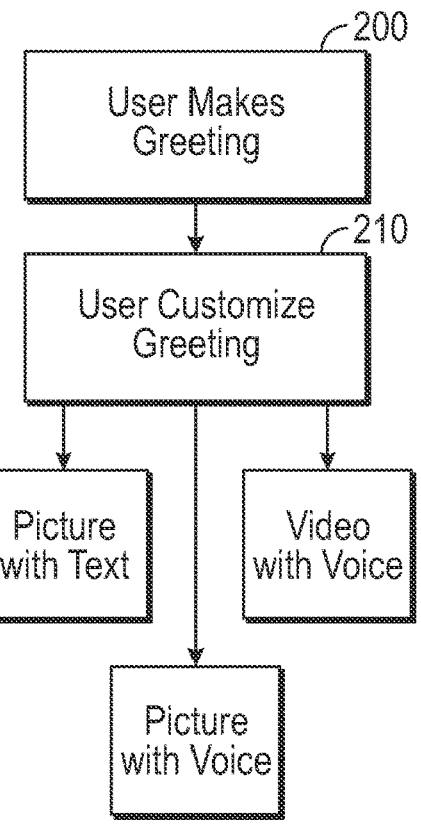
FIG. 2 shows customizing the greeting.
Figure 3:
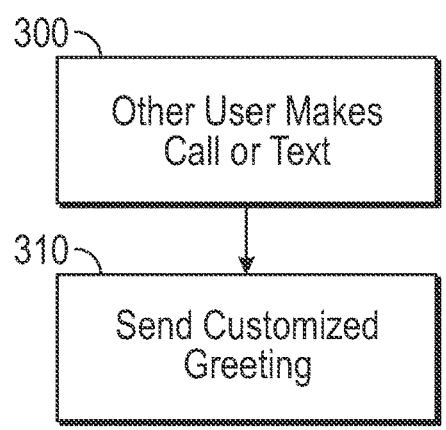
FIG. 3 shows operating the customized.

As shown in FIG. 2, the customize greeting may be a picture with text, picture with voice, or video with voice. Different forms of the greeting may be sent depending on the specific form of message that the user receives. However moreover, other forms of greeting may be received and/or sent.

In this way, the user of the phone customizes the message that is seen by others when communicating with the phone.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example while the above describes only certain kinds of greetings, it should be understood that other kinds of greetings may similarly be used.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form.

When operated on a computer, the computer may be a server computer that sends information to multiple different client computers, or can be a client computer that interacts with a server computer, or can be a stand-alone computer operating based on stored instructions. The computer can include a processor that operates to accept user commands, execute instructions and produce output based on those instructions. The processor is preferably connected to a communication bus. The communication bus may include a data channel for facilitating information transfer between storage and other peripheral components of the computer system. The communication bus further may provide a set of signals used for communication with the processor, including a data bus, address bus, and/or control bus.

The communication bus may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or any old or new standard promulgated by the Institute of Electrical and Electronics Engineers ("IEEE") including IEEE 488 general-purpose interface bus ("GPIB"), and the like.

A computer system used according to the present application preferably includes a main memory and may also include a secondary memory. The main memory provides storage of instructions and data for programs executing on the processor. The main memory is typically semiconductor-based memory such as dynamic random access memory ("DRAM") and/or static random access memory ("SRAM"). The secondary memory may optionally include a hard disk drive and/or a solid state memory and/or removable storage drive for example an external hard drive, thumb drive, a digital versatile disc ("DVD") drive, etc.

At least one possible storage medium is preferably a non-transitory computer readable medium, such as a hard drive, solid state drive, DVD or other memory of any form having stored thereon computer executable code (i.e., software) and/or data thereon in a non-transitory form. The computer software or data stored on the removable storage medium is read into the computer system as electrical communication signals.

The computer system may also include a communication interface. The communication interface allows' software and data to be transferred between computer system and external devices (e.g. printers), networks, or information sources. For example, computer software or executable code may be transferred to the computer to allow the computer to carry out the functions and operations described herein. The computer system can be a network-connected server with a communication interface. The communication interface may be a wired network card, or a Wireless, e.g., Wifi network card.

Software and data transferred via the communication interface are generally in the form of electrical communication signals.

Computer executable code (i.e., computer programs or software) are stored in the memory and/or received via communication interface and executed as received. The code can be compiled code or interpreted code or website code, or any other kind of code.

A "computer readable medium" can be any media used to provide computer executable code (e.g., software and computer programs and website pages), e.g., hard drive, USB drive or other. The software, when executed by the processor, preferably causes the processor to perform the inventive features and functions previously described herein.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A telephone, comprising:
   a first user interface part for the telephone that has a display screen, a microphone, a camera, and a processor,
   the telephone operating for making and receiving calls,
   the processor operating to use the camera and microphone to record a first picture and sound of a user speaking, and the processor operating to set the first picture and sound of the user speaking as being a customized message that includes at least the picture and sound as two different forms of media that are combined together; and
   and the processor operating to play the customized message sent as part of an outgoing communication to another user who is being contacted by the user, in place of a numerical caller ID,
   wherein the telephone also operates for sending text messages, the processor operating to use the camera and microphone to record a second picture and sound of the user speaking, which is different than the first picture and sound of the user speaking, and using said second picture and sound to form a second customized message for texts, and to send the second customized message to said another user who is receiving a text message from the user.

2. The telephone as in claim 1, wherein the processor controls sending the customized message to said another user who is being called, in place of a caller ID.

3. The telephone as in claim 1, wherein the first user interface part also includes an editor which allows changing parts of the greeting.

4. The telephone as in claim 3, wherein the editor allows changing a color scheme of the greeting.

5. The telephone as in claim 3, wherein the editor allows changing a music background that is played with the greeting.

6. The telephone as in claim 1, wherein the greeting is video and sound taken with a camera of the telephone.

7. A telephone system, comprising:
   a computer part that operates to record a first video of a telephone user speaking, and to set the video as a first customized message that includes at least the video with at least picture and sound that are combined together;
   said computer part causing the first message to be sent to a user who is being contacted as part of a telephone call to the user who is being contacted, so that the user who is being called sees the caller ID based customized message in place of a numerical caller ID when receiving a communication from the telephone user,
   said computer part also operating to record a second video of a telephone user speaking, and to set the video as a second greeting to show to a party who is receiving a text message from the telephone user, said second greeting formed of a second customized message that includes at least the video with at least picture and sound that are combined together;
   said computer part causing the second greeting to be played to the party who is receiving a text message from the telephone user, so that the party who is receiving a text message from the telephone user sees a greeting comprising the telephone user along with the message in the user's own voice.

8. The telephone system as in claim 7, wherein the computer part also includes an editor which allows changing parts of the greeting.

9. The telephone system as in claim 8, wherein the editor allows changing a color scheme of the greeting.

10. The telephone system as in claim 7, wherein the editor allows changing a music background that is played with the greeting.

11. The telephone system as in claim 7, wherein the greeting is video and sound taken with a camera of the telephone.

12. A method, comprising:
    using a computer part in a telephone to record a first video of a telephone user speaking using a camera in a telephone associated with the telephone user;
    sending the video and its sound as a first multimedia caller ID sent as part of an outgoing call to another user who is being contacted by the user, in place of a numerical caller ID;
    using the computer part in the telephone to record a second video of the telephone user speaking using a camera in a telephone associated with the telephone user;

sending the second video and its sound as a second multimedia caller ID sent as part of an outgoing text message being sent to another user who is being contacted by a text message by the user.

13. The method as in claim 12, wherein the computer part also includes an editor which allows changing color schemes and music associated with the greeting that was recorded on the telephone.

\* \* \* \* \*